(12) United States Patent
Fleck et al.

(10) Patent No.: US 11,658,324 B2
(45) Date of Patent: May 23, 2023

(54) REDOX FLOW BATTERY AND METHOD FOR OPERATING A REDOX FLOW BATTERY

(71) Applicant: Siemens Aktiengesellschaft, Munich (DE)

(72) Inventors: Robert Fleck, Adelsdorf (DE); Barbara Schricker, Erlangen (DE); Jochen Friedl, Newcastle Upon Tyne (GB); Holger Wolfschmidt, Erlangen (DE); Matthäa Holland-Cunz, Newcastle Upon Tyne (GB); Ulrich Stimming, Newcastle Upon Tyne (GB)

(73) Assignee: LITRICITY GMBH, Oberaudorf (DE)

( * ) Notice: Subject to any disclaimer, the term of this patent is extended or adjusted under 35 U.S.C. 154(b) by 0 days.

(21) Appl. No.: 16/633,815

(22) PCT Filed: Jul. 9, 2018

(86) PCT No.: PCT/EP2018/068481
§ 371 (c)(1),
(2) Date: Jan. 24, 2020

(87) PCT Pub. No.: WO2019/020351
PCT Pub. Date: Jan. 31, 2019

(65) Prior Publication Data
US 2021/0126273 A1  Apr. 29, 2021

(30) Foreign Application Priority Data

Jul. 28, 2017 (EP) .................... 17275118

(51) Int. Cl.
*H01M 8/18* (2006.01)

(52) U.S. Cl.
CPC ............ *H01M 8/188* (2013.01); *H01M 8/18* (2013.01); *Y02E 60/50* (2013.01)

(58) Field of Classification Search
CPC .......... H01M 8/18; H01M 8/188; Y02E 60/50
See application file for complete search history.

(56) References Cited

U.S. PATENT DOCUMENTS

| | | | |
|---|---|---|---|
| 2015/0280259 A1* | 10/2015 | Anderson | H01M 8/20 429/409 |
| 2016/0043425 A1* | 2/2016 | Anderson | H01M 8/188 320/128 |
| 2016/0211539 A1* | 7/2016 | Goeltz | H01M 8/188 |

FOREIGN PATENT DOCUMENTS

| | | | |
|---|---|---|---|
| CN | 104854731 A | 8/2015 | ............ H01M 4/13 |
| WO | 2009/040577 A1 | 4/2009 | ............ H01M 8/18 |

(Continued)

OTHER PUBLICATIONS

Chemist's Companion—A Handbook of Practical Data, Techniques, and References, John Wiley & Sons, 1972, p. 72-79 (Year: 1972).*

(Continued)

*Primary Examiner* — Alexander Usyatinsky
(74) *Attorney, Agent, or Firm* — Slayden Grubert Beard PLLC

(57) ABSTRACT

Various embodiments include a method for operating an electrically rechargeable redox flow battery comprising: using a redox flow battery having a first chamber and a second chamber separated by a membrane, wherein the first chamber comprises a cathode and the second chamber comprises an anode; conducting a first electrolyte as catholyte into the first chamber and conducting a second electrolyte as anolyte into the second chamber; and charging or discharging the redox flow battery. The first electrolyte comprises a first reduction-oxidation pair and the second electrolyte comprises a second reduction-oxidation pair. At least one of the first electrolyte and the second electrolyte comprises a pH-stabilizing buffer for chemically stabilizing the reduction-oxidation pair.

11 Claims, 2 Drawing Sheets

(56) References Cited

FOREIGN PATENT DOCUMENTS

| WO | 2014/001787 A1 | 1/2014 | ............. C01G 41/02 |
|----|----|----|----|
| WO | 2014/018593 A1 | 1/2014 | ............. H01M 4/13 |
| WO | WO 2014/001787 * | 1/2014 | |
| WO | 2019/020351 A1 | 1/2019 | ............. H01M 8/18 |

OTHER PUBLICATIONS

Supplemental material commercially available Glycine/NaCl buffers (Year: 2009).*
Buffer sodium solution pH 10 (Year: NA).*
Buffer sodium solution pH10 (2009) (Year: 2009).*
Pratt, Harry D., et al., "A polyoxometalate flow battery," Elsevier B.V., Journal of Power Sources, vol. 236, 2013, pp. 259-264.
International Search Report and Written Opinion, Application No. PCT/EP2018/068481, 18 pages.
Chinese Office Action, Application No. 201880049552.8, 14 pages, dated Jul. 15, 2022.

* cited by examiner

REDOX FLOW BATTERY AND METHOD FOR OPERATING A REDOX FLOW BATTERY

CROSS-REFERENCE TO RELATED APPLICATIONS

This application is a U.S. National Stage Application of International Application No. PCT/EP2018/068481 filed Jul. 9, 2018, which designates the United States of America, and claims priority to EP Application No. 17275118.2 filed Jul. 28, 2017, the contents of which are hereby incorporated by reference in their entirety.

TECHNICAL FIELD

The present disclosure relates to batteries. Various embodiments may include redox flow batteries and/or methods for operating a redox flow battery.

BACKGROUND

The demand for power fluctuates significantly over the course of the day. With an increasing proportion of power from renewable energies, power generation also fluctuates during the course of the day. In order to be able to compensate for excess supply of power in periods with lots of sun and strong wind when demand for power is low, controllable power plants or storage means are required for storing this energy. Batteries are means for storing electrical energy on an electrochemical basis and are suitable for storing the excess energy. A rechargeable storage means is also called an accumulator. An individual rechargeable storage element is also called a secondary element.

In contrast to conventional secondary elements, the electrode active material in redox flow batteries is liquid. This liquid electrolyte is stored in a tank and pumped into a cathode chamber having a cathode and/or into an anode chamber having an anode. The cathode chamber and anode chamber are typically separated from one another by a membrane. The electrode active material is reduced, or oxidized, at the electrodes. The liquid electrolyte typically comprises a reduction-oxidation pair as the electrode active material.

The electrolyte typically comprises salts in order to achieve a sufficiently high conductivity between the anode and the cathode. The activity of some new reduction-oxidation pairs, in particular oxides of transition metals, falls over the duration of operation in these electrolytes, and with it the capacity of the redox flow battery also decreases during the operation of the redox flow battery in these electrolyte systems.

SUMMARY

The teachings of the present disclosure describe a redox flow battery and a method for operating a redox flow battery, in which the activity of the reduction-oxidation pair, in particular of new reduction-oxidation pairs such as oxides of transition metals, is maintained over the course of operation. For example, some embodiments include a method for operating an electrically rechargeable redox flow battery (1) having the following steps: providing a redox flow battery (1) comprising a first chamber (4) and a second chamber (5), wherein the first chamber (4) is separated from the second chamber (5) by a membrane (3) and wherein the first chamber (4) comprises a cathode (15) and the second chamber (5) comprises an anode (16), conducting a first electrolyte (13) as catholyte into the first chamber (4) and conducting a second electrolyte (14) as anolyte into the second chamber (5), wherein the first electrolyte (13) comprises a first reduction-oxidation pair and the second electrolyte (14) comprises a second reduction-oxidation pair and the first and/or second electrolyte comprises a pH-stabilizing buffer for chemically stabilizing the reduction-oxidation pair, and charging or discharging the redox flow battery (1).

In some embodiments, a polyoxometalate is used at least as the first reduction-oxidation pair.

In some embodiments, the buffer is configured in such a way that a pH buffer range of the buffer includes an electrochemically active pH range of the first and/or second reduction-oxidation pair.

In some embodiments, a buffer having a pH buffer range in a pH range from 1 to 6 is used.

In some embodiments, a buffer having a pH buffer range in a pH range from 6 to 8 is used.

In some embodiments, a buffer having a pH buffer range in a pH range from 8 to 12 is used.

In some embodiments, the pH-stabilizing buffer used is a first buffer comprising hydrochloric acid, glycine and sodium chloride, a second buffer comprising hydrochloric acid and potassium hydrogen phthalate, a third buffer comprising citric acid and sodium citrate, a fourth buffer comprising acetic acid and sodium acetate or a fifth buffer comprising sodium hydroxide and sodium hydrogen phthalate.

In some embodiments, the pH-stabilizing buffer used is a sixth buffer comprising sodium dihydrogen phosphate and disodium hydrogen phosphate.

In some embodiments, the pH-stabilizing buffer used is a seventh buffer comprising sodium tetraborate and sodium hydroxide, an eighth buffer comprising sodium carbonate and sodium bicarbonate or a ninth buffer comprising monosodium phosphate and sodium hydroxide.

As another example, some embodiments include an electrically rechargeable redox flow battery (1) comprising a first chamber (4) and a second chamber (5) separated by a membrane (3), wherein the first chamber (4) comprises a cathode (15) and the second chamber (5) comprises an anode (16), and the first chamber (4) has a first electrolyte (13) as catholyte and the second chamber (5) has a second electrolyte (14) as anolyte, wherein the first electrolyte (13) comprises a first reduction-oxidation pair and the second electrolyte (14) comprises a second reduction-oxidation pair and the first and/or second electrolyte (13, 14) comprise a pH-stabilizing buffer for chemically stabilizing the reduction-oxidation pair.

In some embodiments, there is a first pump (8) for pumping the catholyte through the first chamber (4) and a second pump (9) for pumping the anolyte through the second chamber (5).

In some embodiments, there is a first reservoir tank (6) containing the first electrolyte (13), wherein the first reservoir tank (6) is connected to the first chamber (4) by means of a first line (17), and having a second reservoir tank (7) containing the second electrolyte (14), wherein the second reservoir tank (7) is connected to the second chamber (5) by means of a second line (18).

BRIEF DESCRIPTION OF THE DRAWINGS

Further features, properties, and advantages of various embodiments of the teachings the present disclosure will be apparent from the following description with reference to the appended figures.

DETAILED DESCRIPTION

Figure 1:
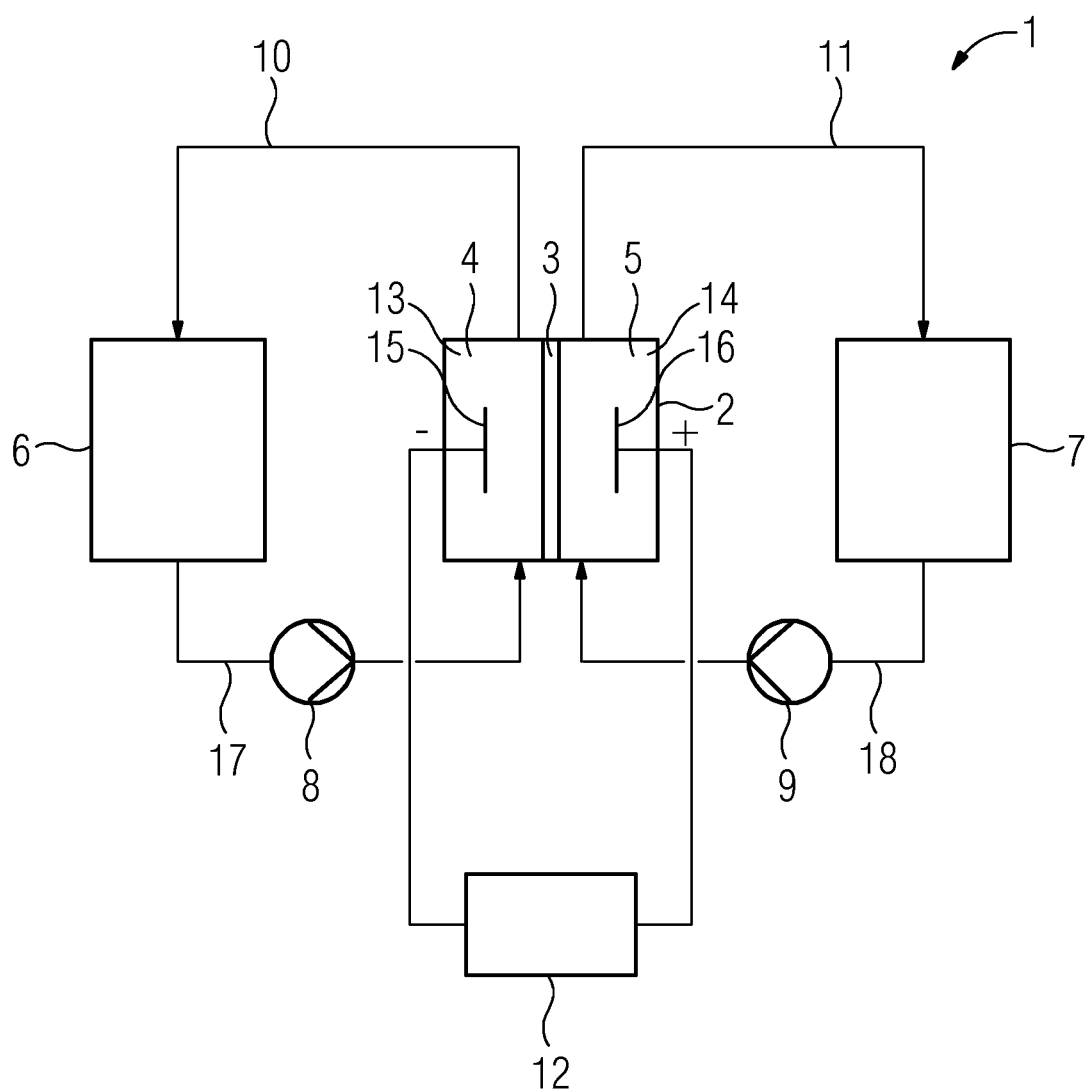
FIG. 1 shows a rechargeable redox flow battery having an electrolyte containing a buffer incorporating teachings of the present disclosure.

Some embodiments of the teachings herein include a method for operating an electrically rechargeable redox flow battery comprising a first chamber and a second chamber, wherein the first chamber is separated from the second chamber by a membrane. The first chamber comprises a cathode and the second chamber comprises an anode. A first electrolyte is conducted as catholyte into the first chamber. A second electrolyte is conducted as anolyte into the second chamber. The first electrolyte comprises a first reduction-oxidation pair. The second electrolyte comprises a second reduction-oxidation pair. The first and/or second electrolyte additionally comprise a pH-stabilizing buffer for chemically stabilizing the reduction-oxidation pair. The redox flow battery is then charged or discharged.

In some embodiments, the electrically rechargeable redox flow battery comprises a first and a second chamber which are separated by a membrane, wherein the first chamber comprises a cathode and the second chamber comprises an anode. The first chamber has a first electrolyte as catholyte and the second chamber has a second electrolyte as anolyte. The first electrolyte comprises a first reduction-oxidation pair and the second electrolyte comprises a second reduction-oxidation pair. The first and/or second electrolyte additionally comprise a pH-stabilizing buffer for chemically stabilizing the reduction-oxidation pair.

Some reduction-oxidation pairs react very sensitively to small pH changes in the electrolyte. These small changes in the pH, in particular caused by protons and/or hydroxide ions which pass through the membrane, lead to a change in the electrolyte which results in an inactivation of the reduction-oxidation pair and thus to a capacity loss of the redox flow battery. In some embodiments, the method and the redox flow battery have at least one electrolyte with at least one pH-stabilizing buffer. A situation may thus be prevented in which, over the course of operation of the redox flow battery, the reduction-oxidation pair changes chemically in such a way that the activity and also the capacity drops. In other words, the capacity of the redox flow battery is kept constant for longer, which leads to a longer service life of the redox flow battery and thus results in lower operating costs.

In some embodiments, a polyoxometalate is used at least as the first reduction-oxidation pair. Polyoxometalates allow desired chemical properties to be set as a result of the fact that a multiplicity of different metals can be integrated into the structure of the polyoxometalates. In some embodiments, very high reaction rates in the redox flow battery are thus anticipated in particular. It is in particular also possible to carry out multistage electron transfers on a polyoxometalate.

In some embodiments, the pH-stabilizing buffer is configured in such a way that a pH buffer range of the buffer includes an electrochemically active pH range of the first and/or second reduction-oxidation pair. "Electrochemically active pH range" refers to the range in which the molecular structure of the reduction-oxidation pair is present in active form, that is to say is present such that it can be reduced or oxidized. It is thus possible to individually adapt the redox flow battery to a particular reduction-oxidation pair. Preservation of the capacity and the service life are thus advantageously achieved.

In some embodiments, the pH buffer range of the buffer is in a pH range from 1 to 6. Buffers which lie in the acidic region are particularly suitable. A first buffer comprising hydrochloric acid, glycerol and sodium chloride can in particular be used in this range. The pH range of this buffer is in a range from 1 to 3.5. In some embodiments, a second buffer comprising hydrochloric acid and potassium hydrogen phthalate can be used in this range. The pH range of this buffer is in a range from 2.2 to 3.8. In some embodiments, a third buffer comprising citric acid and sodium citrate can be used in this pH range. The range of this third buffer is in a range from 3.0 to 6.2. In some embodiments, a fourth buffer comprising acetic acid and sodium acetate can be used. The pH range of the fourth buffer is in a range from 3.6 to 5.6. In some embodiments, a fifth buffer comprising sodium hydroxide and sodium hydrogen phthalate can likewise be used. The buffer range of this buffer is in a pH range from 4.2 to 6.0.

In some embodiments, the pH range of the buffer is in a range from 6 to 8. In some embodiments, the pH-stabilizing buffer used is in particular a sixth buffer comprising sodium dihydrogen phosphate and disodium hydrogen phosphate. The pH range of this buffer is in a range from 5.7 to 8.0.

In some embodiments, the pH range of the buffer is in a range from 8 to 12. In some embodiments, the pH-stabilizing buffer used is in particular a seventh buffer comprising sodium tetraborate and sodium hydroxide. The pH range of this buffer is in a range from 9.2 to 10.6. In some embodiments, an eighth buffer comprising sodium carbonate and sodium bicarbonate can be used in this range. The pH range of this buffer is in a range from 9.2 to 10.7. In some embodiments, a ninth buffer comprising monosodium phosphate and sodium hydroxide can be used. The pH range of this buffer is in a range from 11.0 to 11.9.

In some embodiments, the redox flow battery comprises a first pump for pumping the catholyte through the first chamber and a second pump for pumping the anolyte through the second chamber. By way of pumping the electrolyte, the capacity of the redox flow battery can be adjusted via the flow rate of the electrolyte.

In some embodiments, the redox flow battery comprises a first reservoir tank containing the first electrolyte, wherein the first reservoir tank is connected to the first chamber by means of a first line. The redox flow battery additionally comprises a second reservoir tank containing the second electrolyte, wherein the second reservoir tank is connected to the second chamber by means of a second line. The amount of the electrolyte can be varied via the size of the reservoir tank. As a result, the energy-to-power ratio of the redox battery can be adjusted. In addition, the size of the reservoir tank can be adapted to the specific capacity of the redox flow battery, which is defined as ampere hours per liter of electrolyte (unit: Ah/l).

FIG. 1 shows a rechargeable redox flow battery 1. The rechargeable redox flow battery 1 comprises a redox flow unit 2. The redox flow unit 2 comprises a membrane 3, wherein the membrane 3 separates a first chamber 4 and a second chamber 5 from one another. A cathode 15 is arranged in the first chamber 4. An anode 16 is arranged in the second chamber 5. The cathode 15 and the anode 16 are connected to a power grid via an electrical energy connection 12. The rechargeable redox flow battery 1 additionally comprises a first tank 6 which is connected via a first line to the first chamber 4 with the cathode 15 by means of a first pump 8. The first chamber 4 is in turn connected to the first tank 6 via a third line 10. The rechargeable redox flow battery 1 comprises a second tank 7 which is connected via a second line to the second chamber 5 with the anode 16 via a second pump 9. The second chamber 5 is in turn connected to the second tank 7 with a fourth line 11.

A first electrolyte 13 having a polyoxometalate as the first reduction-oxidation pair is situated in the first chamber 4. A buffer is also present in the first electrolyte 13 in the first chamber. In this example, the buffer used is a buffer comprising glycine and sodium chloride. A second electrolyte 14 comprising lithium chloride is situated in the second chamber 5. In some embodiments, the flow rates of the first pump 8 and of the second pump 9 are in a range from 800 ml/min/m$^2$ to 4000 ml/min/m$^2$, e.g. in a range between 1200 ml/min/m$^2$ and 3600 ml/min/m$^2$. During the operation of the redox flow battery 1 at room temperature, the reduction-oxidation pair polyoxometalate remains active and therefore the capacity of the redox flow battery 1 is maintained. This leads to a long service life of the redox flow battery 1.

Figure 2:
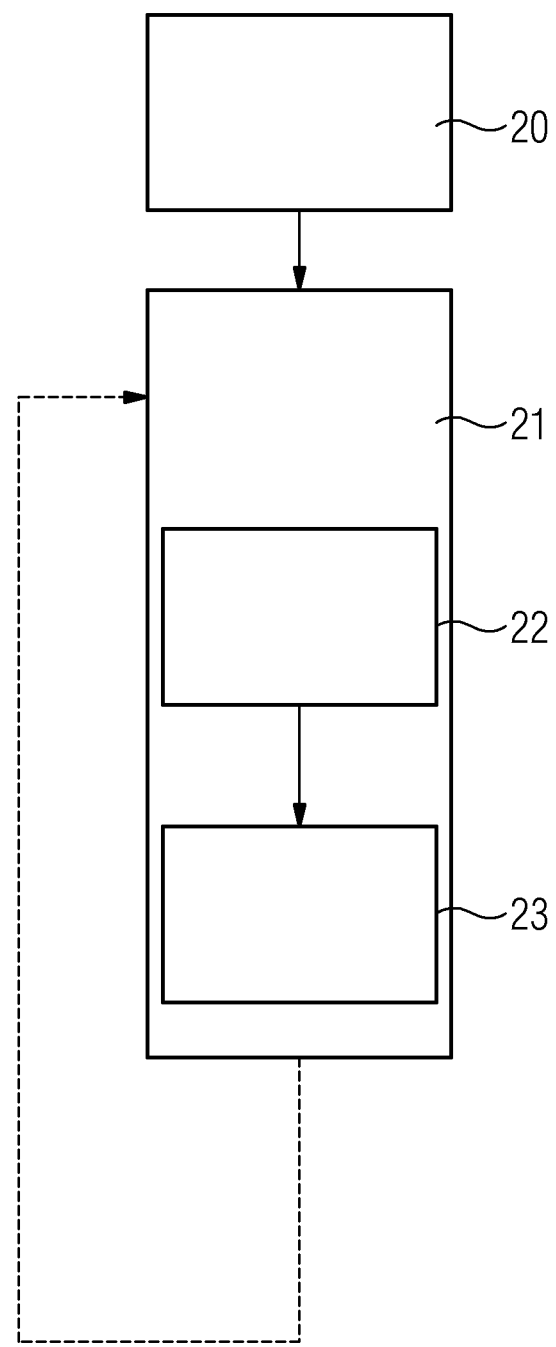
FIG. 2 shows a schematic overview of a method for operating the redox flow battery incorporating teachings of the present disclosure.

FIG. 2 shows a schematic overview of the method for operating a redox flow battery 1. In some embodiments, the first and second electrolyte are conducted into the first chamber 4 and into the second chamber 5. This occurs continuously during the operation of the redox flow battery 1. This step is therefore represented in FIG. 2 with a box 21 encompassing method steps 22 and 23. Charging of the redox flow battery 22 takes place before the redox flow battery 1 can be discharged 23. The charging 22 and discharging 23 can be performed as a cyclic process.

What is claimed is:

1. A method for operating an electrically rechargeable redox flow battery, the method comprising:
   using a redox flow battery having a first chamber and a second chamber separated by a membrane, wherein the first chamber comprises a cathode and the second chamber comprises an anode;
   conducting a first electrolyte as catholyte into the first chamber and conducting a second electrolyte as anolyte into the second chamber;
   wherein the first electrolyte comprises a first reduction-oxidation pair and the second electrolyte comprises a second reduction-oxidation pair; and
   the first electrolyte comprises a first pH-stabilizing buffer for chemically stabilizing the reduction-oxidation pair, the first buffer including glycine and sodium chloride;
   the second electrolyte comprises a second pH-stabilizing buffer with at least one combination selected from the group consisting of: hydrochloric acid and potassium hydrogen phthalate, citric acid and sodium citrate, acetic acid and sodium acetate; and sodium hydroxide and sodium hydrogen phthalate; and
   charging or discharging the redox flow battery.

2. The method as claimed in claim 1, wherein at least one of the first reduction-oxidation pair and the second reduction-oxidation pair comprises a polyoxometalate.

3. The method as claimed in claim 1, wherein a pH buffer range of the pH-stabilizing buffer includes an electrochemically active pH range of the reduction-oxidation pair.

4. The method as claimed in claim 3, wherein the pH buffer range is from 1 to 6.

5. The method as claimed in claim 3, wherein the pH buffer range is from 6 to 8.

6. The method as claimed in claim 3, wherein the pH buffer range is from 8 to 12.

7. The method as claimed in claim 1, wherein the second pH-stabilizing buffer comprises sodium dihydrogen phosphate and disodium hydrogen phosphate.

8. The method as claimed in claim 1, wherein the second pH-stabilizing buffer comprises at least one of:
   sodium tetraborate and sodium hydroxide;
   sodium carbonate and sodium bicarbonate; or
   monosodium phosphate and sodium hydroxide.

9. An electrically rechargeable redox flow battery comprising:
   a first chamber and a second chamber separated by a membrane;
   wherein the first chamber comprises a cathode and the second chamber comprises an anode; and
   the first chamber has a first electrolyte as catholyte and the second chamber has a second electrolyte as anolyte;
   the first electrolyte comprises a first reduction-oxidation pair and the second electrolyte comprises a second reduction-oxidation pair; and
   the first electrolyte comprises a pH-stabilizing buffer for chemically stabilizing the reduction-oxidation pair, the pH-stabilizing buffer including glycine and sodium chloride;
   the second electrolyte comprises a second pH-stabilizing buffer with at least one combination selected from the group consisting of: hydrochloric acid and potassium hydrogen phthalate, citric acid and sodium citrate, acetic acid and sodium acetate; and sodium hydroxide and sodium hydrogen phthalate.

10. The redox flow battery as claimed in claim 9, further comprising:
    a first pump for pumping the catholyte through the first chamber; and
    a second pump for pumping the anolyte through the second chamber.

11. The redox flow battery as claimed in claim 9, further comprising:
    a first reservoir tank storing the first electrolyte, the first reservoir tank connected to the first chamber by a first line; and
    a second reservoir tank storing the second electrolyte, the second reservoir tank connected to the second chamber by a second line.

* * * * *